(12) United States Patent
Parry et al.

(10) Patent No.: US 10,069,802 B2
(45) Date of Patent: Sep. 4, 2018

(54) METHOD FOR SECURELY CONFIGURING CUSTOMER PREMISE EQUIPMENT

(71) Applicant: Ciena Corporation, Hanover, MD (US)

(72) Inventors: Simon Paul Parry, Manuden (GB); James Alexander Ivens Holtom, Writtle (GB)

(73) Assignee: Ciena Corporation, Hanover, MD (US)

( * ) Notice: Subject to any disclaimer, the term of this patent is extended or adjusted under 35 U.S.C. 154(b) by 305 days.

(21) Appl. No.: 14/183,180

(22) Filed: Feb. 18, 2014

(65) Prior Publication Data

US 2015/0237018 A1 Aug. 20, 2015

(51) Int. Cl.
*H04L 29/06* (2006.01)
*H04L 29/12* (2006.01)

(52) U.S. Cl.
CPC ...... *H04L 63/0428* (2013.01); *H04L 61/2503* (2013.01); *H04L 61/6068* (2013.01)

(58) Field of Classification Search
CPC .................. H04L 63/0428; H04L 61/2503
See application file for complete search history.

(56) References Cited

U.S. PATENT DOCUMENTS

| 6,715,075 | B1 * | 3/2004 | Loukianov | H04L 41/0806 |
| | | | | 380/258 |
| 7,277,548 | B2 * | 10/2007 | Park | H04L 63/0457 |
| | | | | 380/270 |
| 7,334,258 | B1 | 2/2008 | Ford et al. | |
| 7,389,415 | B1 * | 6/2008 | Kumar | G06F 21/72 |
| | | | | 713/162 |

(Continued)

OTHER PUBLICATIONS

Jun. 15, 2015 European Search Report issued in European Patent Application No. EP15155627.

(Continued)

*Primary Examiner* — John B King
*Assistant Examiner* — Darshan I Dhruv
(74) *Attorney, Agent, or Firm* — Clements Bernard Walker PLLC; Chrisopher L. Bernard; Lawrence A. Baratta, Jr.

(57) ABSTRACT

A method for securely configuring a customer premise equipment in a network. The network including a configuration server, a DHCP server, and the customer premise equipment. The method includes receiving a request from the customer premise equipment for leasing an Internet Protocol (IP) address to the customer premise equipment. The method further includes embedding at least a portion of a Media Access Control (MAC) address of the customer premise equipment into the IP address leased to the customer premise equipment. The method includes leasing the IP address to the customer premise equipment. Further, the method enables authentication of customer premise equipment, before providing configuration to the customer premise equipment. The method includes use of characteristic attributes of the customer premise equipment to generate cryptographic keys for secure connection. Moreover, the method includes establishing a secure connection between the configuration server and the customer premise equipment for transfer of a configuration file and a set of encryption keys. The configuration file and the set of encryption keys are used to securely configure the customer premise equipment.

19 Claims, 5 Drawing Sheets

(56) References Cited

U.S. PATENT DOCUMENTS

| | | | | |
|---|---|---|---|---|
| 7,430,664 B2* | 9/2008 | Zhu | H04L 63/0435 | 709/220 |
| 7,586,895 B2* | 9/2009 | Borgione | H04L 12/18 | 370/349 |
| 7,929,535 B2* | 4/2011 | Chen | H04L 61/2007 | 370/349 |
| 8,595,758 B2* | 11/2013 | Taylor | H04N 5/4401 | 709/223 |
| 9,124,474 B2* | 9/2015 | Cherchali | H04L 29/12216 | |
| 9,270,454 B2* | 2/2016 | Maruti | H04L 9/0866 | |
| 9,479,440 B1* | 10/2016 | Crisp | H04L 47/20 | |
| 2003/0204721 A1* | 10/2003 | Barrus | H04L 51/38 | 713/153 |
| 2005/0005154 A1 | 1/2005 | Danforth et al. | | |
| 2005/0021766 A1* | 1/2005 | McKeowen | H04L 12/2801 | 709/228 |
| 2005/0282523 A1* | 12/2005 | Yoshihara | H04L 12/2854 | 455/411 |
| 2006/0013150 A1* | 1/2006 | Park | H04L 29/12018 | 370/254 |
| 2006/0129694 A1* | 6/2006 | Ishida | H04L 12/2818 | 709/238 |
| 2006/0274899 A1* | 12/2006 | Zhu | H04L 9/083 | 380/281 |
| 2007/0106894 A1* | 5/2007 | Zhang | H04L 63/0428 | 713/170 |
| 2008/0080373 A1* | 4/2008 | Eldar | H04L 63/162 | 370/230 |
| 2008/0126806 A1* | 5/2008 | Morten | H04L 63/126 | 713/176 |
| 2009/0006860 A1* | 1/2009 | Ross | H04L 63/126 | 713/189 |
| 2009/0097496 A1* | 4/2009 | Nakamura | H04N 5/268 | 370/419 |
| 2009/0103726 A1* | 4/2009 | Ahmed | H04L 9/0668 | 380/46 |
| 2009/0125957 A1* | 5/2009 | Singh | H04N 21/41 | 725/111 |
| 2009/0169006 A1* | 7/2009 | Zick | H04L 63/0853 | 380/255 |
| 2010/0008370 A1* | 1/2010 | Li | H04L 61/2514 | 370/401 |
| 2010/0111529 A1* | 5/2010 | Zeng | H04L 12/18 | 398/58 |
| 2010/0220856 A1* | 9/2010 | Kruys | H04L 9/0833 | 380/44 |
| 2010/0250940 A1* | 9/2010 | Kitagawa | H04N 1/32117 | 713/171 |
| 2010/0281508 A1* | 11/2010 | Poder | H04N 21/2221 | 725/93 |
| 2011/0033052 A1* | 2/2011 | Yamada | H04L 9/0877 | 380/270 |
| 2011/0239283 A1* | 9/2011 | Chern | G06F 21/33 | 726/6 |
| 2014/0068252 A1* | 3/2014 | Maruti | H04L 9/0866 | 713/162 |
| 2015/0032905 A1* | 1/2015 | Celebi | H04L 61/2015 | 709/245 |

OTHER PUBLICATIONS

Thompson et al., "IPv6 Stateless Address Autoconfiguration," Sep. 2007, pp. 1-30.

Durvy et al., "Poster Abstract: Making Sensor Networks IPv6 Ready," Retrieved from the Internet: URL:http://www.sics.se/˜adam/durvy08making.pdf [retrieved on Jun. 12, 2015].

* cited by examiner

METHOD FOR SECURELY CONFIGURING CUSTOMER PREMISE EQUIPMENT

BACKGROUND OF THE INVENTION

1. Field of the Invention

The invention disclosed herein relates, in general, to network equipment configuration. More specifically, the present invention relates to a method of configuring customer premise equipment securely.

2. Description of the Related Art

Communication technology has turned around the way people carry out their day to day activities. Particularly, emergence and penetration of various broadband access technologies has made life convenient and has definitely changed the way we work, communicate, and socialize.

Various broadband access technologies such as Digital Subscriber Lines (DSL), Integrated Services Digital Network (ISDN), Leased Lines, Fiber-to-the-home (FTTH), Satellite Broadband and the like are used by Internet Services Providers (ISPs) to provide broadband access to customer premises. In order to deliver the broadband access, ISPs set-up a Customer Premise Equipment (CPE) at customer premises. Each ISP configures the CPE to enable the broadband services.

Currently, most of the ISPs rely on Low-Touch-Provisioning feature to configure the CPE. This feature relies on the use of Dynamic Host Configuration Protocol (DHCP) to provide every node connected to the CPE with an IP address and a location to obtain its configuration. Further, each node may use Trivial File Transfer Protocol (TFTP) to download a configuration file and self-configures itself based on the configuration file. Alternatively, the DHCP standard allows BOOTP and HTTP methods for collecting configuration files, but these methods are unencrypted, which presents a challenge for ISPs.

When the ISP allows the use of TFTP instead of BOOTP or HTTP for downloading the configuration file, it works well only for the ISPs that allow use of unencrypted protocols such as TFTP. However, ISPs having strict security policies and firewalls usually prohibit use of unencrypted protocols such as TFTP, thereby preventing use of Low-Touch-Provisioning capabilities.

To counter this problem, some ISPs rely on encrypted file transfer protocols such as Secure File Transfer Protocol (SFTP). SFTP further requires that the credentials must be installed on the node. However, this technique is also not deployable in most of the environments because it is not easy to manage the credentials for large number of installations and becomes a logistical challenge for the ISP. Further, since this technique uses static credentials, it is prone to security threats.

There are some other techniques based on TR-069 standard that use HTTP server or TFTP server for downloading the configuration file, however, these techniques are also prone to aforementioned problems.

According to the foregoing discussion, it can be observed that the existing methods and techniques used for configuring CPE have one or more limitations. Firstly, these techniques are not secure. Secondly, these techniques are difficult to manage at both factory level and deployment level. In light of this, there is a need for a method for securely configuring customer premise equipment, which overcomes some or all of the limitations identified above.

SUMMARY

Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description.

In some exemplary embodiments of the present invention, a method for securely configuring a customer premise equipment (CPE) in a network is provided. The network including a configuration server and the customer premise equipment. The method includes receiving a request from the customer premise equipment for leasing an Internet Protocol (IP) address to the customer premise equipment. The method further includes embedding at least a portion of a Media Access Control (MAC) address of the customer premise equipment into the IP address leased to the customer premise equipment. Further, the method includes leasing the IP address to the customer premise equipment. Moreover, the method includes establishing a secure connection between the configuration server and the customer premise equipment using a temporary set of encryptions keys for transfer of a configuration file and a permanent set of encryption keys. The configuration file and the temporary set of encryption keys are used to securely configure the customer premise equipment.

In some exemplary embodiments of the present invention, a method for establishing a secure connection between a configuration server and a customer premise equipment in a network is provided. The method includes receiving a notification from the customer premise equipment regarding an IP address leased to the customer premise equipment. The IP address leased to the customer premise equipment is embedded with at least a portion of a Media Access Control (MAC) address of the customer premise equipment. The method further includes identifying the MAC address of the customer premise equipment from the IP address leased to the customer premise equipment. Further, the method includes generating a pair of public and private keys for transferring the configuration file to the customer premise equipment. The pair of public and private keys is generated based on the MAC address of the customer premise equipment. Moreover, the method includes receiving a request for transferring a configuration file to the customer premise equipment. Finally, the method includes establishing the secure connection between the configuration server and the customer premise equipment for securely transferring the configuration file to the customer premise equipment. The configuration file is used to configure the customer premise equipment.

In some exemplary embodiments of the present invention, a method for establishing a secure connection between a configuration server and a customer premise equipment in a network is provided. The problem solved is an asymmetrical one—the head end node is trusted and the CPE needs to become trusted. The CPE should therefore be authenticated against the network. For example, if the CPE knows the correct algorithm to generate the key pair, the CPE should be authenticated and allowed onto the network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings

Figure 1:
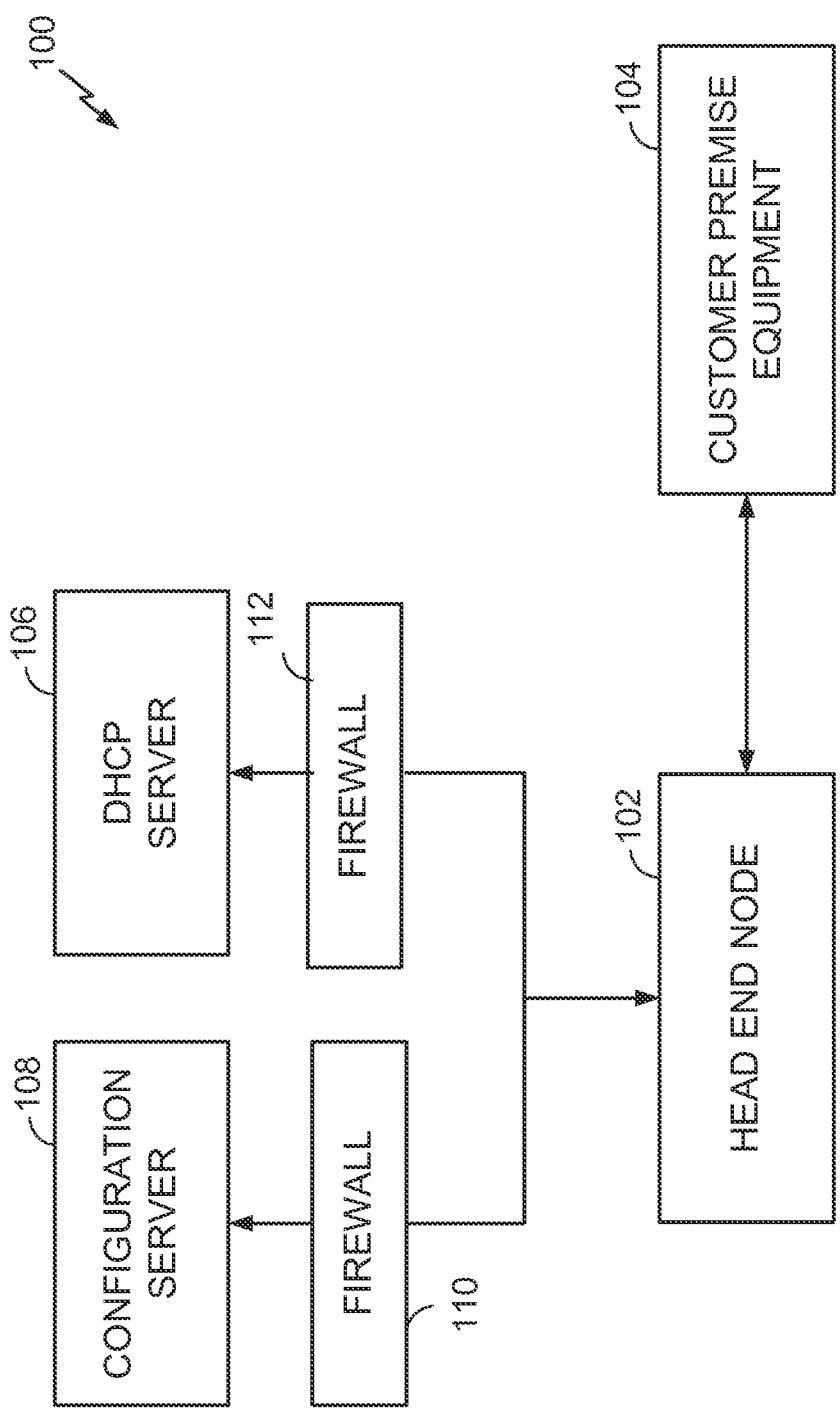
FIG. 1 illustrates an exemplary network, in accordance with various embodiments of the present invention.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION

The various embodiments of the invention are described hereinafter with reference to the accompanying drawings, in which embodiments of the invention are shown. However, the various embodiments may be embodied in many different forms and should not be construed as limited to the embodiments set forth herein. Rather, these embodiments are provided to illustrate various aspects of the invention.

Aspects of embodiments of the invention are disclosed in the following description and related drawings directed to specific embodiments of the invention. Alternate embodiments may be devised without departing from the scope of the invention. Additionally, well known elements of the invention will not be described in detail or will be omitted so as not to obscure the relevant details of embodiments of the invention. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored there in a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Referring now to the drawings, FIG. 1 illustrates an exemplary network 100, in accordance with some embodiments of the present invention. The network 100 can include a head end node 102, a Customer Premise Equipment (CPE) 104, and a dynamic host configuration protocol (DHCP) server 106, a configuration server 108, both server 106 and server 108 are separated from head end node 102 and customer premise equipment 104 by a firewall 110/112. Examples of the CPE 104 can include, but are not limited to, modem, router, internet access gateway, switch, set-top box, residential gateway, fixed mobile terminal, home networking adaptor and other such devices that enable customers to access communications services, such as internet, Internet Protocol Television (IPTV), Voice Over IP (VoIP), and the like. These devices are installed by service providers at customer premises to provide desired communications services to the customers. For example, if a customer opts for broadband internet connection from an Internet Service Provider (ISP) such as AT&T, Comcast, or CenturyLink, to deliver the broadband connection to the customer, the ISP installs a CPE at the customer premises. Further, using the CPE 104 installed by the ISP, the customer can further create a Local Area Network (LAN) in the customer premises, so that multiple computers, nodes, or other devices requiring an Internet connection can be connected to the broadband internet.

Generally, the CPE 104 has to be configured at the time of installation. The configuration is required to enable to services required by the customer and also to associate a customer account with the CPE 104. Further, the network includes a DHCP server 106. DHCP server 106 is responsible for leasing and maintaining IP addresses of the customer premise equipment connected to the head end node 102. Whenever the customer premise equipment 104 connects to the node 102, the DHCP server 106 determines the network to which the customer premise equipment 104 is connected, and then leases an IP address to the customer premise equipment 104. Usually, the DHCP server 106 leases the IP address to the customer premise equipment 104 for a limited interval of time (known as lease time). Before expiration of the lease time, the customer premise equipment 104 can request the DHCP server 106 to renew the IP address, so that the customer premise equipment 104 can continue to use the IP address leased to the customer premise equipment 104 by the DHCP server 106. Ordinarily the DHCP server 106 maintains a pool of IP addresses, from which leases are made, on a first-available sequential basis. There may be some attempt to maintain a loose association between specific devices and the leased IP.

Moving to the configuration server 108, the configuration server 108 is a server that provides a configuration file to the customer premise equipment 104. Further, the customer premise equipment 104 self-configures itself based on the configuration file. Examples of the configuration server 108 may include HTTP server, BOOTP server, or TFTP server. Further, the configuration server 108 may be available in the same LAN as other components of the network 100 or may be available on a Wide Area Network and accessible through the Internet.

As described above in conjunction of FIG. 1, the network 100 is typical of the network that exists between service provider and subscribers. However, those skilled in the art would appreciate that the network 100 may contain greater or fewer number of components without deviating from the scope of the invention.

Figure 2:
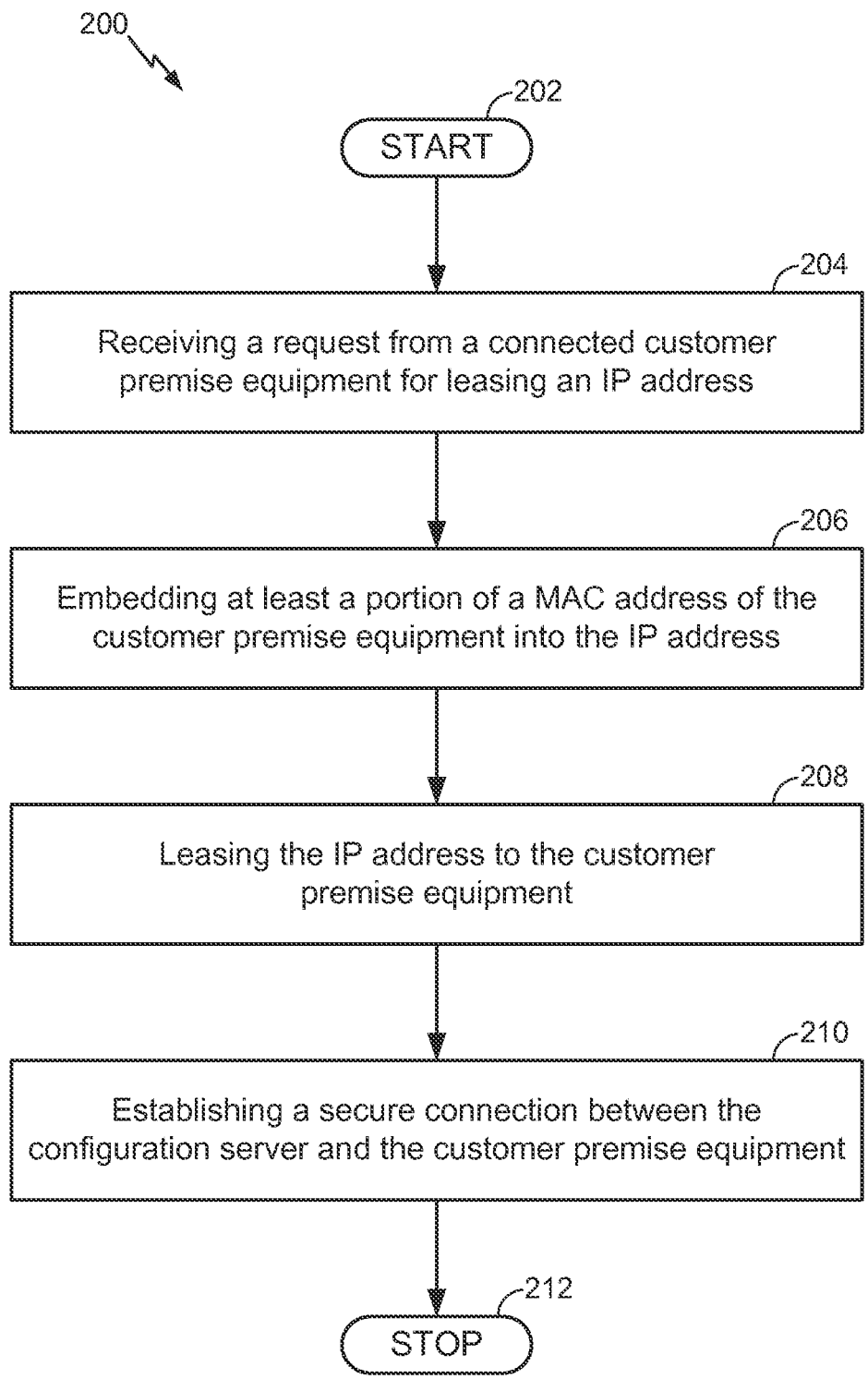
FIG. 2 is a flow chart describing a method for signaling the customer premise equipment identity in accordance with an embodiment of the present invention.

Referring to FIG. 2, a flow chart describing a method for signaling the Customer Premise Equipment (CPE) identity in a network is described. To describe FIG. 2, reference will be made to FIG. 1, although it is understood that the method 200 can be implemented in any other suitable system. Moreover, the invention is not limited to the order in which the steps are listed in the method 200. In addition, the method 200 can contain a greater or fewer numbers of steps than those shown in the FIG. 2.

In one embodiment, the method 200 can include one or more method steps for securely configuring the CPE 104 in the network 100. The method 200 is initiated at step 202. At step 204, a request from a connected CPE 104 is received for leasing an IP address to the CPE 104. Upon receiving the request for leasing the IP address, the DHCP server 106 comes into action. As already described in conjunction with FIG. 1, DHCP server 106 is responsible for leasing and maintaining IP addresses.

As soon as the node 102 connects to the CPE 104, both of these devices come on the same network, i.e., LAN, and by virtue of being on the same LAN, the DHCP server 106 is able to know the Media Access Control (MAC) address of the CPE 104. Further, the DHCP server 106 identifies the MAC address of the CPE 104 and embeds at least a portion of the MAC address of the CPE 104 into the IP address leased to the CPE 104 at step 206.

MAC address is a unique address (value) assigned to a network interface/adapter for communications on the physical network segment. MAC address is also known as physical address or hardware address. Generally, the MAC addresses are assigned by the manufacturer of a network interface controller and are stored in the hardware itself. Each MAC address is of six bytes (i.e., 48 bits) and is of following format: M[1]-M[2]-M[3]-M[4]-M[5]-M[6]. In this format, M[1], M[2], M[3], M[4], M[5], and M[6] are of one byte each. Further, M[1]-M[3] represent the ID number assigned to the manufacturer of the network interface/adapter and M[4]-M[6] represents the serial number assigned to the network interface/adapter by the manufacturer of the network interface/adapter.

In case the CPE 104 is using Internet Protocol Version 4 (IPv4), the DHCP server can use the unique serial number, i.e., M[4]-M[6] and embed in the IP address to be leased to the CPE 104. That means last 24-bits of the 48-bits MAC address are embedded in the IP address leased to the CPE 104. For example, if MAC address of the CPE 104 is 10.17.21.03, then the IP address assigned to the CPE 104 can be 10.11.15.03. However, in case the CPE 104 is using Internet Protocol Version 6 (IPv6), the entire MAC address may be embedded within an appropriate site-local unicast address, for example, FEC0::M[1]M[2]:M[3]M[4]:M[5]M[6]. It should be understood that more or less than 24 bits can be used and more or less than the entire MAC address can be used.

At step 208, the DHCP server leases the IP address embedded with the MAC address to the CPE 104. Further, the CPE 104 requests configuration from the configuration server 108 using the IP address leased to the CPE 104. Based on this, the configuration server 108 is able to read the MAC address of the CPE 104 (embedded in the IP address) irrespective of whether the CPE 104 and the configuration server 108 are directly connected on the same LAN segment where the MAC addresses are mutually visible, or via a routed/firewall connectivity where the MAC addresses are not generally visible.

Once the embedded MAC address of the CPE 104 is visible to the configuration server 108, it can be utilized in multiple ways as a starting point to establish a secure connection/channel between the configuration server 108 and the CPE 104. The secure connection can be used to transfer the configuration file from the configuration server 108 to the CPE 104.

In one embodiment, the request for transferring the configuration file via the secure connection is initiated by the CPE 104 and the CPE 104 establishes the secure connection between the configuration server 108 and the CPE 104 for transfer of the configuration file and a set of encryption keys at step 210.

In one embodiment, the MAC address of the CPE 104 can be used as a lookup-key or as a seed value to a deterministic pseudo-random prime generating algorithm. By employing the same algorithm and seed value, at both the CPE 104 and the configuration server 108, the CPE 104 and the configuration server 108 independently generate a matching pair of public and private keys. Further, the matching pair of public and private keys can be used to establish of the secure connection between the CPE 104 and the configuration server 108. Further, the secure connection between the configuration server 108 and the CPE 104 can be a Secure Shell (SSH) tunnel.

For example, the pseudo-random prime generating algorithm may use the MAC address of the CPE 104 as seed value. Further, a salt value may be added to this seed value. Usually, the salt value is a fixed large number which obfuscates the operation of the pseudo-random prime generating algorithm. The value thus obtained may be multiplied by a large prime number and the modulus of the result is then taken. The modulus is determined by the length of key required. The pseudo-random algorithm is then repeatedly run with the output of the previous iteration as its input, over a large number of iterations (for example, 1000 iterations) to produce a result of the required length. Following this, the algorithm then checks whether the result thus obtained is prime or not. In case, the result is prime, the output is that result. However, in case, the result is not a prime number, then further iterations of the algorithm are performed until a prime result is achieved. This algorithm will always produce the same key from the initial MAC address and salt value. Since the MAC address is known to both the CPE 104 and the configuration server 108, both the CPE 104 and the configuration server 108 are able to independently generate the matching pair of public and private keys. Further, the matching pair of public and private keys can be used to establish of the secure connection between the CPE 104 and the configuration server 108. Once the secure connection is established, the configuration file and the permanent set of encryption keys are transmitted to the CPE 104. The permanent set of encryption keys may also be based on the MAC address of the CPE 104. Further, the configuration file and the set of encryption keys are used to securely configure the CPE 104.

Following this, the method 200 terminates at step 212.

Figure 3:
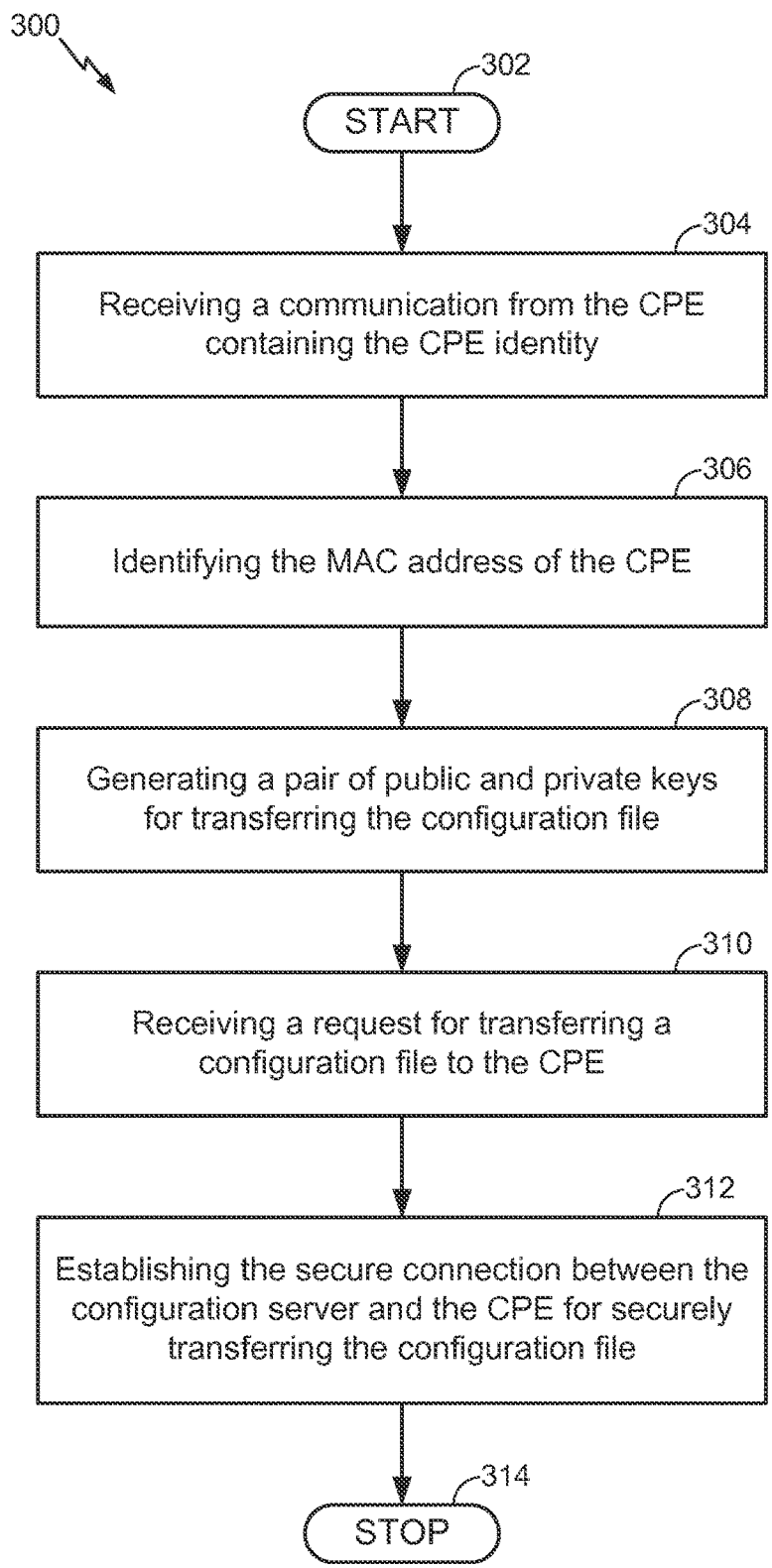
FIG. 3 is a flow chart describing a method for establishing a secure connection between a configuration server and customer premise equipment in a network, in accordance with another embodiment of the present invention.
Figure 4:
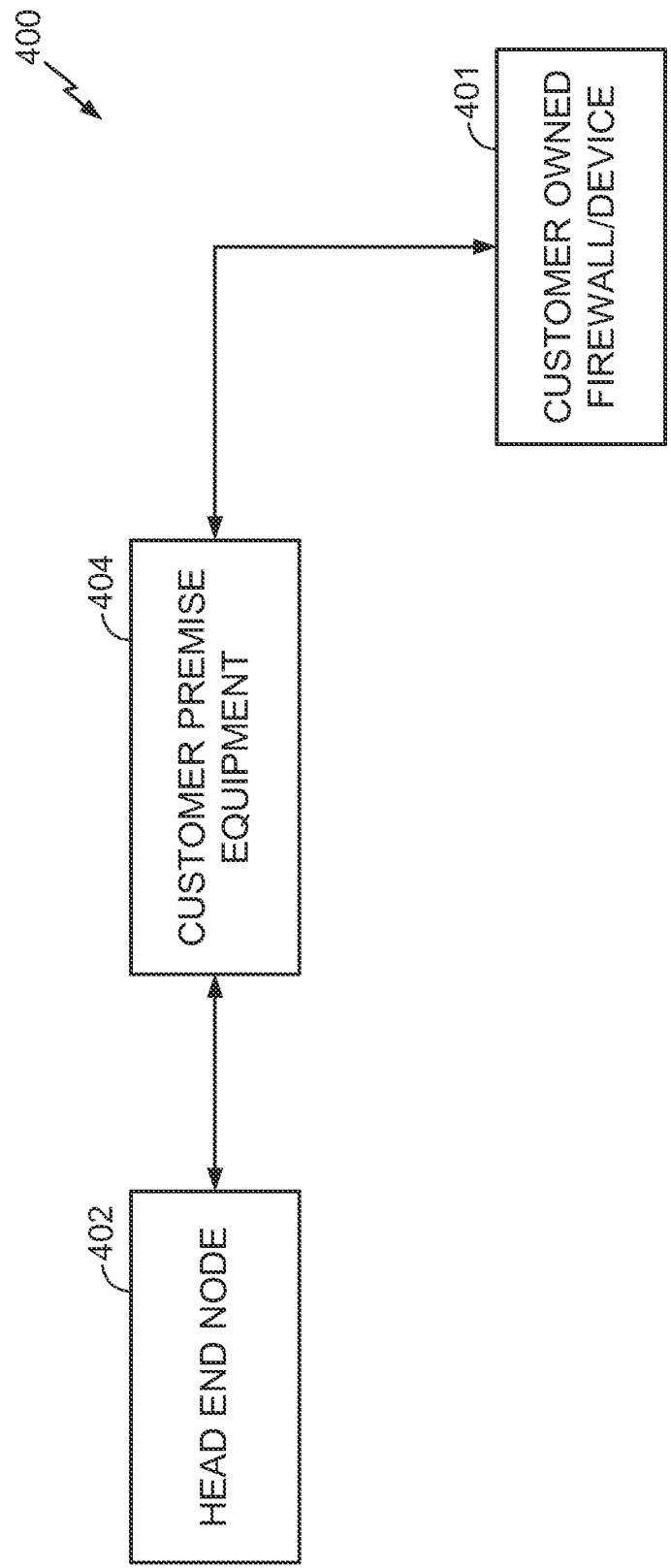
FIG. 4 illustrates an exemplary network with additional customer owned equipment in accordance with various embodiments of the present invention.
Figure 5:
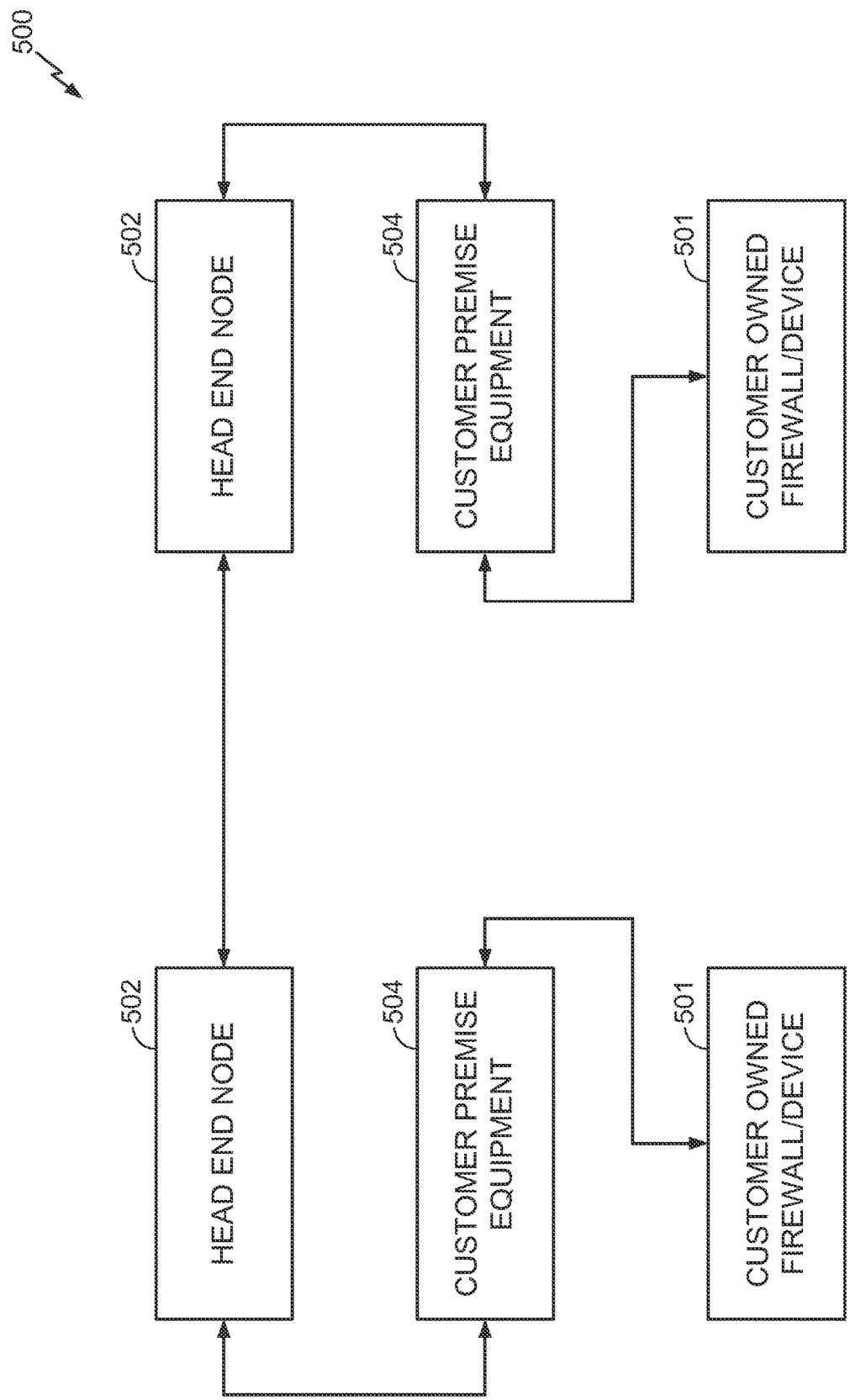
FIG. 5 illustrates an exemplary network with multiple customers and customer owned devices in accordance with various embodiments of the present invention.

Referring to FIG. 3, a flow chart describing a method for establishing a secure connection between a configuration server and a CPE for securely configuring the customer premise equipment in a network is described. To describe FIG. 3, reference will be made to FIG. 1 and FIG. 2, although it is understood that the method 300 can be implemented in any other suitable system. Moreover, the invention is not limited to the order in which the steps are listed in the method 300. In addition, the method 300 can contain a greater or fewer numbers of steps than those shown in the FIG. 3.

In one embodiment, the method 300 can include one or more method steps for establishing a secure connection between the configuration server 108 and the CPE 104 for securely configuring the CPE 104 in the network 100. The method 300 is initiated at step 302. At step 304, the configuration server 108 receives a communication from the CPE 104 containing the identity of the CPE 104. Based on this, the configuration server 108 is able to read the MAC address of the CPE 104 (embedded in the IP address) irrespective of whether the CPE 104 and the configuration server 108 are directly connected on the same LAN segment where the MAC addresses are mutually visible, or via a routed/firewall connectivity where the MAC addresses are not generally visible.

Following this, the configuration server 108 identifies the MAC address of the CPE 104 based on the IP address of the CPE 104 at step 306. Following this, the configuration server 108 receives a request for transferring the configuration file to the CPE 104 at step 310. This request is triggered by the CPE 104.

In one embodiment, the configuration server 108 may generate a prime number (Bp) using the pseudo-random prime generating algorithm, as described in conjunction with FIG. 2. The pseudo-random algorithm may be initialized using the sum of the salt value and the MAC address of the CPE 104. Further, a predetermined minimum number of iterations are performed to generate a prime number (Bp). Furthermore, the algorithm is run an additional minimum number of times required to generate a second random number (Bq). These two prime numbers are then multiplied to create a large compound number (Bn).

In this embodiment, as the CPE 104 has prior knowledge of its MAC address, therefore the CPE 104 is able to generate primes numbers (Bp and Bq) and thus product (Bn) to encrypt the messages towards the configuration server 108. Further, the configuration server 108 uses the MAC address of the CPE 104 (learned through the CPE 104), to generate the same primes (Bp and Bq), thereby enabling decryption of messages received from the CPE 104. Since the public key (Bn) is never transmitted, the only way for the configuration server 108 to successfully decrypt and receive messages is that the CPE 104 should also have the correct public key (Bn) that matches the private key (Bp) on the configuration server 108.

In this embodiment the ability of the CPE 104 to correctly encrypt messages towards the configuration server 108, and decrypt messages received from the configuration server 108 provides authentication that the device is authorized to make a request for configuration from the configuration server 108, and receive such a configuration.

To summarize, as the MAC address is known to both the CPE 104 and the configuration server 108, both the CPE 104 and the configuration server 108 can independently generate the matching pair of public and private keys. Further, the matching pair of public and private keys can be used to establish the secure connection between the CPE 104 and the configuration server 108 at step 312. Once the secure connection is established, the configuration file and the permanent set of encryption keys are transmitted to the CPE 104. Further, the configuration file is used to configure the CPE 104.

Following this, the method 300 terminates at step 314.

Clearly, the methods described in conjunction with FIG. 2 and FIG. 3 provide a secure way of configuring the CPE 104, however, there may be additional methods to enhance security of the secure connection, such as using a different salt value per service provider. Further, this salt value can be user-configurable.

In other embodiments, a public key of the configuration server 108 may be pre-computed at the factory and loaded onto the CPE 104 while manufacturing. This alternative embodiment has the significant advantage that neither the algorithm nor the salt value is held on the CPE 104. Using this embodiment, avoids exposure of the algorithm to cryptanalytic attack. Further, this embodiment enables arbitrary revision of the deterministic pseudo-random prime generating algorithm without requiring a new software image for the CPE 104.

In other embodiments the DHCP server 106 may be configured to contact the configuration server 108 to provide authentication that the device is authorized to make a request for configuration from the configuration server 108, and receive such a configuration.

In other embodiments another characteristic or set of characteristics of the CPE 104 which can be identified from the MAC address may be used to seed the pseudo-random prime generating algorithm. To enable such an embodiment, a lookup-function would be required, or an additional algorithm where an algorithmic relation between MAC address and the required characteristic might exist.

The public key of the configuration server 108 pre-computed at the factory may be computed using standard key generation techniques. The manufacturer makes record of the public and private keys and the MAC address of the CPE 104. The association of the MAC address and the public and private keys may be securely passed to the end-customer independently of physical node shipment, and thereby enabling the secured communication between the configuration server 108 and the CPE 104. The association might be communicated via a periodic dataset supplied to the customer, or an online system providing the public and private keys in response to query by the MAC address.

Various embodiments, as described above, provide a method for securely configuring customer premise equipment, which has several advantages. One of the several advantages of this invention is that it is easy to use yet secure. Another advantage of this invention is that it allows Low-Touch-Provisioning technique to be used by ISPs who have security policies that prohibit use of unencrypted protocols such as TFTP. Yet another advantage of some embodiments is that the current invention is much easier for ISPs to practice, as the current state of practice does not facilitate unique SSH key or credentials for each device, as it becomes a daunting task for the ISPs to manage unique credentials for each device. Further, as the current invention uses variable keys generated by algorithm, it is much more secure as compared to current techniques used by the ISPs or network equipment manufacturers.

While the foregoing disclosure shows illustrative embodiments of the invention, it should be noted that various changes and modifications could be made herein without departing from the scope of embodiments of the invention as defined by the appended claims.

Likewise, the functions, steps and/or actions of the methods in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for securely configuring a customer premise equipment in a network, the network including a configuration server, a dynamic host configuration protocol (DHCP) server, and the customer premise equipment, the method comprising:
   receiving a request at the DHCP server from the customer premise equipment for leasing an Internet Protocol (IP) address to the customer premise equipment;
   embedding at least a portion of a Media Access Control (MAC) address of the customer premise equipment into the IP address leased to the customer premise equipment;
   leasing the IP address to the customer premise equipment;
   establishing a secure connection between the configuration server and the customer premise equipment for transfer of a configuration file using a permanent set of encryption keys, wherein the configuration server obtains the at least a portion of the MAC address by reading directly from the IP address to establish the secure connection irrespective of how the customer premise equipment and the configuration server are connected to one another, and wherein the configuration server and the customer premise equipment each independently generate the permanent set of encryption keys based on the at least a portion of the MAC address as a seed value and a salt value added thereto based on a service provider associated with the customer premises equipment before any communication there between; and
   securely configuring the customer premise equipment using the configuration file and the permanent set of encryption keys.

2. The method as recited in claim 1 further comprising notifying the configuration server regarding the IP address leased to the customer premise equipment.

3. The method as recited in claim 1, wherein establishment of a secure connection between the configuration server and the customer premise equipment is triggered by the customer premise equipment.

4. The method as recited in claim 1, wherein embedding at least a portion of the MAC address of the customer premise equipment into the IP address leased to the customer premise equipment and leasing the IP address to the customer premise equipment is performed by the DHCP server.

5. The method as recited in claim 1, wherein in case the customer premise equipment supports Internet Protocol version 4 (IPv4), then last 24-bits of the 48-bits MAC address are embedded in the IP address leased to the customer premise equipment.

6. The method as recited in claim 1, wherein in case the customer premise equipment supports Internet Protocol version 6 (IPv6), then at least a portion of the MAC address is embedded in the IP address leased to the customer premise equipment.

7. The method as recited in claim 1, wherein the secure connection between the configuration server and the customer premise equipment is a Secure Shell (SSH) tunnel.

8. A method for establishing a secure connection between a configuration server and a customer premise equipment for securely configuring the customer premise equipment in a network, the method comprising:
   receiving a communication from the customer premise equipment containing the identity of the customer premise equipment, wherein the IP address leased to the customer premise equipment is embedded with at least a portion of a Media Access Control (MAC) address of the customer premise equipment;
   identifying the MAC address of the customer premise equipment from the IP address leased to the customer premise equipment; receiving a request for transferring a configuration file to the customer premise equipment;
   generating a pair of public and private keys for securely transferring the configuration file to the customer premise equipment, wherein the pair of public and private keys is generated independently at each of the customer premise equipment and the configuration server based on the at least a portion of the MAC address as a seed value and a salt value added thereto based on a service provider associated with the customer premise equipment before any communication there between;
   establishing the secure connection between the configuration server and the customer premise equipment for securely transferring the configuration file to the customer premise equipment, wherein the configuration server obtains the at least a portion of the MAC address by reading directly from the IP address to establish the secure connection irrespective of how the customer premise equipment and the configuration server are connected to one another; and
   configuring the customer premise equipment using the configuration file.

9. The method as recited in claim 8, wherein the request for transferring the configuration file to the customer premise equipment is triggered by the customer premise equipment.

10. The method as recited in claim 8, wherein in case the customer premise equipment supports Internet Protocol version 4 (IPv4), then last 24-bits of the 48-bits MAC address are embedded in the IP address leased to the customer premise equipment.

11. The method as recited in claim 8, wherein in case the customer premise equipment supports Internet Protocol version 6 (IPv6), then the complete MAC address is embedded in the IP address leased to the customer premise equipment.

12. The method as recited in claim 8, wherein the secure connection between the configuration server and the customer premise equipment is a Secure Shell (SSH) tunnel.

13. The method as recited in claim 8, wherein the pair of public and private keys is generated by using a pseudo-random prime generator algorithm.

14. The method as recited in claim 8, wherein the pair of public and private keys is generated by using at least a portion of the MAC address or some characteristic of the customer premise equipment as a seed.

15. A non-transitory computer-readable medium comprising code for causing a computer to:

receive a request at a dynamic host configuration protocol (DHCP) server from a customer premise equipment for leasing an Internet Protocol (IP) address to the customer premise equipment;

embed at least a portion of a Media Access Control (MAC) address of the customer premise equipment into the IP address leased to the customer premise equipment;

lease the IP address to the customer premise equipment;

establish a secure connection between a configuration server and the customer premise equipment for transfer of a configuration file using a permanent set of encryption keys, wherein the configuration server obtains the at least a portion of the MAC address directly from the IP address to establish the secure connection irrespective of how the customer premise equipment and the configuration server are connected to one another, and wherein the configuration server and the customer premise equipment each independently generate the permanent set of encryption keys based on the at least a portion of the MAC address as a seed value and a salt value added thereto based on a service provider associated with the customer premises equipment before any communication therebetween; and securely configuring the customer premise equipment using the configuration file and the permanent set of encryption keys.

16. The non-transitory computer-readable medium of claim 15, wherein the code further causes notification of the configuration server regarding the IP address leased to the customer premise equipment.

17. The non-transitory computer-readable medium of claim 15, wherein the code further causes establishment of a secure connection between the configuration server and the customer premise equipment is triggered by the customer premise equipment.

18. The non-transitory computer-readable medium of claim 15, wherein the code further causes embedding at least a portion of the MAC address of the customer premise equipment into the IP address leased to the customer premise equipment and leasing the IP address to the customer premise equipment is performed by the DHCP server.

19. The non-transitory computer-readable medium of claim 15, wherein the code further causes a last 24-bits of a 48-bits MAC address to be embedded in the IP address leased to the customer premise equipment.

* * * * *